R. EMERSON, Jr.
Sugar Mill.
No. 23,238.
Patented March 15, 1859.
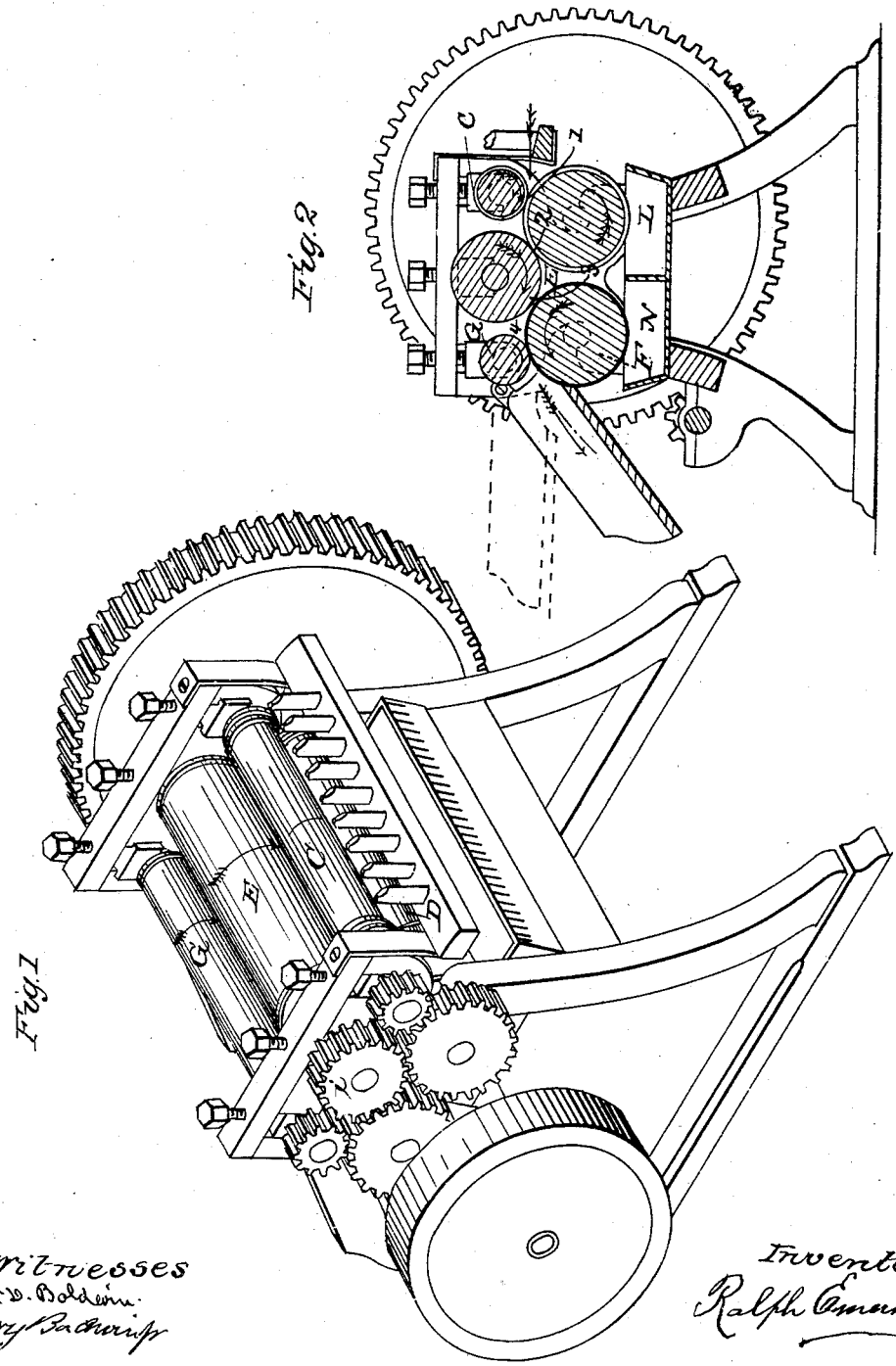

UNITED STATES PATENT OFFICE.

RALPH EMERSON, JR., OF ROCKFORD, ILLINOIS.

IMPROVEMENT IN PROCESSES FOR EXTRACTING AND ASSORTING VEGETABLE JUICES BY PRESSURE.

Specification forming part of Letters Patent No. 23,238, dated March 15, 1859.

*To all whom it may concern:*

Be it known that I, RALPH EMERSON, Jr., of Rockford, in the county of Winnebago and State of Illinois, have invented a new and useful improvement in the process of manufacturing sugar or molasses from vegetable juices, and particularly from the sorghum or Chinese sugar-cane; and I do hereby declare that the following is a full, clear, and exact description of the same, reference being had to the annexed drawings, making a part of this specification, in which—

Figure 1 represents a view in perspective, and Fig. 2 a vertical longitudinal section, of the machine.

From experiments upon the Chinese sugar-cane I have found that the juice of best quality is contained in the pith beneath the rind, and that the rind yields a juice of inferior quality, which has a very deleterious effect upon the juice of the pith when mixed therewith.

The invention, which it is my object to cover by this patent, consists of a process of expressing the juices from the pith and rind consecutively and collecting the portion of better quality produced by the pith separately from the inferior juice of the rind.

The means which I have employed for the collection of the two juices separately is based on the further ascertained fact that the juice of the pith is extracted by a comparatively light pressure, while a heavier pressure is required for the expression of the inferior juice of the rind.

A mill which I have contrived for the separate expression and collection of the pith and rind juices consists of a series of pressure-rolls, (C D E F G,) made to revolve in the direction indicated by the arrows. The stalks of cane are fed in between the rollers C and D, and as they pass through are subjected to comparatively light pressure at 1 and 2, and afterward to a more intense pressure at 3 and 4, where, for that purpose, the intervals between the rollers are made smaller than the intervals at 1 and 2. The juice produced by the lighter pressure on the roller D flows down over that roller and drops into a receptacle, L, while the product of the intense pressures at 3 and 4 on the roller F flows over that roller into another receptacle, N. From these receptacles the juice can be drawn through suitable apertures.

As I have procured a separate patent for the said mill, I refer to that patent for a more full description of it.

In this patent I do not mean to limit myself to any special means for the extraction and separation of the pith and rind juices; but What I here claim as my invention, is—

1. The process of expressing and collecting the juice of the pith separately from that of the rind, for the purpose set forth.

2. As one of the methods (and the best to me known,) whereby the process of extracting the juices separately may be beneficially carried into effect, the subjection of the cane to a light pressure to express the juice of the pith previously to the employment of a heavier pressure to express the juice of the rind, whether the said pressures be successively performed in the same or in different machines.

In testimony whereof I have hereunto subscribed my name.

RALPH EMERSON, JR.

Witnesses:
WM. D. BALDWIN,
HENRY BALDWIN, Jr.